United States Patent Office 3,231,580
Patented Jan. 25, 1966

3,231,580
SUBSTITUTED IMIDAZOLINES
Hans S. Mannheimer, Toms River, N.J., assignor to Hans S. Mannheimer and John J. McCabe, Jr., as joint venturers
No Drawing. Filed June 30, 1961, Ser. No. 122,609
5 Claims. (Cl. 260—309.6)

This invention relates to novel compounds and to methods for producing them. In one of its more specific aspects this invention is directed to novel amphoteric cycloimidines and to methods for making them.

The novel compounds of this invention are water-soluble, amphoteric surface active agents finding application in a wide variety of different fields. They may be used as general purpose detergents, textile treating agents, as emulsifying and emulgating agent. They also find employment as components in cosmetic preparations, and due to their high foaming and other characteristics find use as components in various shampoo formulations.

The compounds of the present invention are of the following general Formula I and are also salts produced by reacting the same or different species of said compounds with each other:

FORMULA I

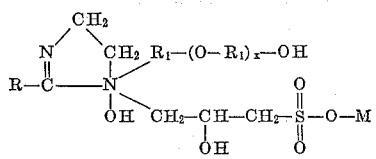

wherein R is a hydrocarbon radical of 4–18 carbon atoms; each $R_1$ is selected from the group consisting of divalent saturated hydrocarbon groups, such as alkylene groups of 2–4 carbon atoms, which are —$C_2H_4$—; —$C_3H_7$—; and —$C_4H_9$—; M is hydrogen or its equivalent and preferably an alkali metal equivalent and for most purposes sodium or potassium, and $x$ is 0–8.

The novel salts are produced by reacting under certain conditions of two or more moles of compounds of Formula I wherein M attached to the $SO_3$ group of 1 mole is replaced by another mole of such compound to replace the OH group thereof attached directly to the nitrogen of said other mole.

While more than 3 moles of said compounds of Formula I may be reacted with each other under certain conditions, the following are illustrative examples of some of said salts when only 2 and 3 moles respectively are reacted with each other and are known as Salts I and II respectively:

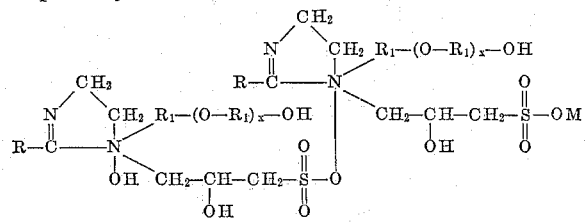

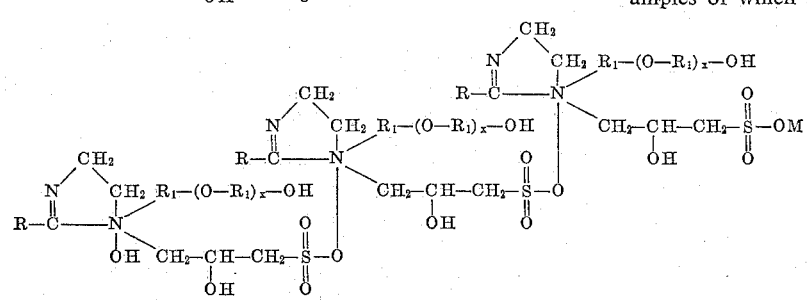

Said salts, examples of which are said Salts I and II, as distinguished from internal salts, are external salts as shown in the illustrative structural formulas thereof. Moreover they are self-salts in that two or more moles of the same specie of compounds of Formula I may be reacted with each other to produce such external salts or 1 mole of a specie may be reacted with 1 mole of a different specie of compounds of Formula I to provide external self-salts of different species coupled together for example in the manner of Salts I and II. Of course, more than two different species, as for Example 3 or more may be used if desired thereby to provide external self-salts in which the resultant external salt such as Salt II may be produced, with all three different species as reactants for the production thereof.

For the production of said novel compounds of Formula I, I employ as reactants my novel sultone described and claimed in my U.S. patent application Ser. No. 120,-921, filed June 30, 1961, subsequently issued as U.S. Patent 3,100,779, and of the following formula:

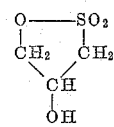

and a cycloimidine of the following Formula II:

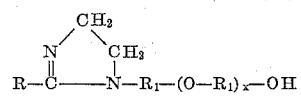

Certain of said cycloimidine of Formula II may be produced by reacting one mole proportion of a monocarboxylic acid, R—COOH, wherein R is a hydrocarbon radical of 4–18 carbon atoms, with one mole proportion of diamine reactant such as amino ethyl ethanol amine ($NH_2C_2H_4NHC_2H_4OH$), amino ethyl propanol amine ($NH_2C_2H_4NHC_3H_6OH$) and amino ethyl butanol amine ($NH_2C_2H_4NHC_4H_8OH$) respectively to provide cycloimidines of the following formula Y:

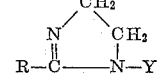

wherein Y is $C_2H_4OH$, $C_3H_6OH$ or $C_4H_8OH$ depending upon which of the aforesaid diamine reactants was employed.

The specific steps which may be used for carrying out said reaction for the production of said compounds of formula Y are well known to those skilled in the art. Among some of the methods which may be employed for that purpose are those described in my U.S. Patent 2,528,378, issued on October 31, 1950.

Still other cycloimidines of Formula II may be produced by reacting one mole proportion of a compound of formula Y with 1–8 moles proportion of an alkylene oxide, such as ethylene oxide, propylene oxide or butylene oxide in the manner known to the art thereby to provide a large number of different compounds, specific examples of which are compounds the same as the cycloimidines of formula Y except that for the $C_2H_4OH$, $C_3H_6OH$ or $C_4H_8OH$ there is substituted specifically any of the following, for example, $$C_2H_4OC_2H_4OH$$
$$C_2H_4(OC_2H_4)_3OH$$
$$C_2H_4OC_3H_6OH$$
$$C_2H_4(OC_4H_8)_4OH$$
$$C_3H_6OC_2H_4OH$$
$$C_3H_6(OC_3H_6)_4OH$$
$$C_3H_6(OC_4H_8)_2OH$$
$$C_4H_8(OC_2H_4)_3OH$$
$$C_4H_8(OC_3H_6)_2OH$$
$$C_4H_8OC_3H_6OH$$

Of course many other like groups containing more or less of alkylene oxide than is present in the specific groups above set forth may be substituted for said $C_2H_4OH$ in formula Y.

The organic acid reacted with a diamine, examples of which are hereinbefore set forth, is one of 5–19 carbon atoms and containing a single COOH group, or any of the available anhydrides of said acids and by the term monocarboxylic organic acid as used herein, I mean to include both the acid and the available anhydride thereof which I regard as the equivalent of the acid. These acids may be: the aliphatic open chain saturated or unsaturated fatty acids as well as said fatty acids containing substituents, such as aryl radicals, as for example, acids of the type of Twitchell fatty acids; cycloaliphatic carboxylic acids preferably containing no more than 4 condensed nuclei and examples of which are hexahydrobenzoic, resinic, and naphthenic acids; as well as aromatic and aromatic-aliphatic carboxylic acids, such as $$(C_6H_5COOH)$$

$(C_6H_5CH_2COOH)$, etc.

While carboxylic acids having any number of carbon atoms may be employed, I prefer to employ those having at least 5 carbon atoms and preferably 5–19 carbon atoms in straight chain relationship. The acids which I employ may be derived from a number of different sources. Among some of them are the acid components chosen from oil or fats of animal, marine or vegetable origin and these includes; the acids of coconut, palm kernel and palm oil, also of soy bean, linseed, olive, rapeseed, cottonseed, peanut and castor oil which contain large proportions of unsaturated fatty acids and also the acids derived from tallow, fish and seal oils, whale or shark oils and the hydrogenated acids from these sources. Moreover, the synthetic high molecular weight fatty acids, obtained by the oxidation of paraffin wax and similar high molecular weight hydrocarbons by means of gaseous oxidizing agents may be employed. In addition the acid may be one of the resinic acids, such as abietic acid, or the naphthenic acids and long chain fatty acids having an aromatic hydrocarbon radical connected directly with the aliphatic chain (Twitchell fatty acids) as are obtainable from oleic, ricinoleic, linoleic and similar unsaturated fatty acids. Instead of employing mixture of acids from oil, fats and resins, single acids may be used, for example caproic, pimelic, heptylic, caprylic, undecylic, lauric, palmitic, stearic, behenic, arachic, and carotic, oleic, erucic, linoleic, linolenic, ricinoleic and stearic acids.

My novel sultone employed as a reactant herein may be prepared by employing the procedure set forth in the following Example A, all parts being given by weight unless otherwise specified.

EXAMPLE A

About 104 parts of sodium meta bisulfite $Na_2S_2O_5$ were charged into a glass flask and then there was also charged into said flask 600 parts of water into which was dissolved 1 cc. of a 50% aqueous solution of NaOH thereby to dissolve said sodium meta bisulfite therein. The solution was then heated to about 90° C. and maintained at that temperature for a period of about 15 minutes thereby to convey substantially all of the sodium meta bisulfite to sodium acid sulfite ($NaHSO_3$). The reactant solution of sodium acid sulfite was cooled to about 28° C. and by slow additions 101 parts of epichlorhydrin was added thereto with constant stirring over a 45 minute period, and the temperature of the mass throughout said period was controlled by external cooling thereby to maintain the temperature thereof at about 47°–50° C. throughout said period. Thereafter and for the next 2½ hours, stirring of the mass was continued and its temperature maintained at 47°–50° C. Then with or without a reflux condenser coupled with said flask, the mass therein while heated to boiling and maintained in that condition for a period of about 1 hour. Then the mass in said flask is cooled to room temperature, is hereinafter known as Mass A, and consists essentially of an aqueous solution of the novel sultone, whose structural formula is hereinbefore set forth, and NaCl by-product.

According to this invention said novel sultone may be reacted with one or a combination of two or more of said cycloimidines of Formula II, in the mole proportion of about 1 of sultone to 1 of said cycloimidines. Said reaction is preferably carried out in an aqueous medium and with the use of external heat to provide an aqueous solution of one or a combination of two or more compounds which are internal salts of the following Formula III:

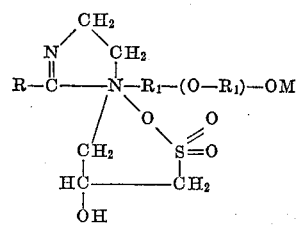

When a small quantity, as for example 1 cc. of said aqueous solution of a compound of Formula III is added to 100 cc. of clear tap water and shaken therewith, there is a change from clear to cloudy. This indicates its lack of water-solubility in low concentration in which said compounds normally would be used, as surface active agents. I have discovered that the structures thereof may be changed thereby to convert and render them water-soluble, in low concentrations, as well as high concentrations, amphoteric and further characterized by having good surface activity, detergent and wetting properties and useful in shampoos, cosmetics, in the fields of treating of textiles, etc.

For the aforesaid purpose the novel compounds of Formula III may under alkaline conditions in an aqueous medium be heated thereby to convert them into said novel water-soluble amphoterics having the other foregoing properties and being compounds of said Formula I which are soluble in low and high concentrations in an aqueous medium whose pH may be as low as 1 and as high as 14.

The alkaline agent preferably employed to render said aqueous medium alkaline is an alkali metal hydroxide, such as NaOH, KOH or the like and the amount of said agent is preferably at least about 1 mole proportion thereof per mole proportion of said novel compounds of Formula III in said aqueous medium.

I have also discovered that said novel water-soluble amphoteric surface active agents may be self reacted in the presence of an acidic agent, such as hydrochloric, acetic, hydroxyacetic, phosphoric acids, etc., to provide external self-reacted salts, such as Salts I and II respectively, for example, whose structural formulas are hereinbefore set forth; and are given herein by way of illustration and not limitation for the reason that more than 3 moles of compounds of Formula I may be reacted with each other to provide still higher molecular weight similar salts.

The following are novel illustrative methods for producing novel illustrative compounds of this invention, all parts being given by weight, unless otherwise specified.

EXAMPLE 1

Said entire Mass A which is an aqueous solution of my novel sultone, in Example A herein is heated to 80° C. and while at that temperature there are added with stirring 269 parts (1 mole) of a compound, hereinafter referred to as compound X, of the following formula:

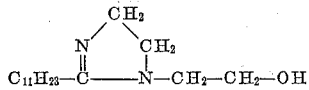

The resultant mass is then, while being stirred, allowed to stand overnight in a room whose temperature is 20° C. The next morning, the mass which has cooled to 20° C., while stirred, is heated to and maintained to 80° C. about 3 hours, whereby there is produced an aqueous solution having a pH of 6.8 (electrically measured) of a compound of the following formula:

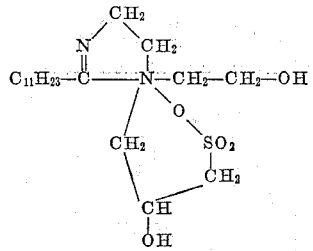

The aforesaid compound which is an internal salt is not water-soluble in low concentrations. This is evidenced when one cc. of said aqueous solution at the end of said 3 hour period is added to 100 cc. of clear tap water and shaken therewith it causes a change from clear to cloudy.

Then 88 parts of a 50% aqueous solution of NaOH is added slowly to said entire aqueous mass after said 3 hour period while constant stirring still is maintained and the entire mass is heated to and then maintained at a temperature of 75°–85° C. for a period of about 3 hours thereby to provide an aqueous solution hereinafter known as Solution 1 consisting essentially of water in which are dissolved the NaCl byproduct and novel amphoteric 1 of the following formula:

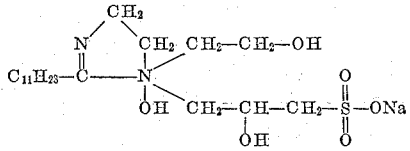

Said amphoteric 1 is water-soluble even in very low concentrations as evidenced by adding 1 cc. of said Solution 1 to 100 cc. of water, which remain clear after said addition.

EXAMPLES 2 AND 3

Employ the same procedure and components as set forth in Example 1, except that for the 269 parts of compound X employed therein, there are substituted 251 parts (1 mole) of a capric acid derivative and 291 parts (1 mole) of a stearic acid derivative of amino ethyl ethanol amine respectively, which are the same as the compound X except that the radical ($C_{11}H_{23}$) thereof is replaced by the respective capryl ($C_9H_{19}$) radical and the stearyl ($C_{17}H_{25}$) radical whereby there are produced novel amphoterics 2 and 3 respectively, which are the same as amphoteric 1 except for the substitution of the $C_9H_{19}$ and $C_{17}H_{35}$ radicals respectively for the $C_{11}H_{23}$ radical of amphoteric 1.

EXAMPLES 4 AND 5

Employ the same procedure and components as Example 1 except that instead of the 269 parts of compound X of Example 1 there are employed 284 and 395 parts respectively of the following respective reactants:

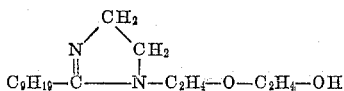

and

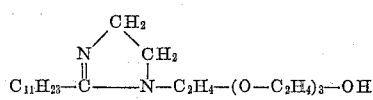

to produce novel amphoterics 4 and 5 of the following respective formulas:

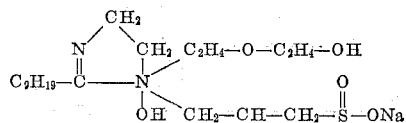

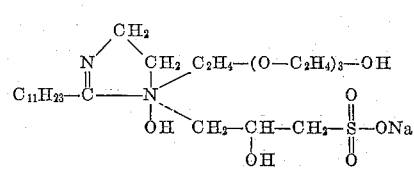

EXAMPLES 6-ON

Employ the same procedure and components as those of Example 1 herein except that for the 1 mole proportion of compound X, there may be substituted .6 mole proportion of any other compound which is the same as compound X, except that for the radical $C_{11}H_{23}$ thereof, there is substituted any other hydrocarbon radical of 4–18 carbon atoms and/or for the $CH_2$—$CH_2$—OH group thereof there is substituted any of the other

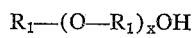

groups hereinbefore defined and specific examples of which are hereinbefore set forth so that there are produced literally hundreds of different amphoterics which are of the same formula as amphoteric 1 of said Example 1 herein except that for the radical $C_{11}H_{23}$ thereof there is substituted any other hydrocarbon radical of 4–18 carbon atoms, and/or for the radical $CH_2$—$CH_2OH$ thereof, there is substituted any of the other aforesaid radicals $R_1$—$(O$—$R_1)_xOH$.

All of said novel amphoterics of Examples 1–5 and 6-on are water surface active amphoterics having excellent water-solubility at high as well as very low concentrations and in aqueous solution having good foaming properties and find the uses hereinbefore set forth.

I have further discovered that said individual amphoteric compounds may be reacted with themselves or with each other to provide salts thereof. For this purpose there is added to the aqueous solution of the amphoteric prepared according to any of said examples a quantity of an acidic agent, such as a HCl, to lower the pH thereof. In general, the quantity of HCl added is in the range of about ½ to 1 mole proportion of HCl per mole proportion of amphoteric of Formula I in solution. Then the aqueous mass is heated to 40°–50° C. and maintained at that temperature for about 5–10 minutes to provide the salts of the amphoteric employed, some general examples of such salts are said Salts I and II whose structural formulas are hereinbefore set forth and other of such salts in which more than three moles of the amphoteric employed have reacted to provide still longer chain salts than said Salt II. The length of the salt formation, examples of some of them being said Salts I and II, are dependent upon the concentration of the novel amphoterics of Formula I in solution, the temperature of the mass, the quantity of HCl employed, etc. In most instances the resultant salt formations are mixtures of salts of different lengths, all of which of course are salts of at least 2 moles of the amphoteric used.

The following are illustrative methods for producing such salts and are given by way of illustration and not limitation, all parts being given by weight unless otherwise specified.

EXAMPLE 1S

The entire Solution 1 of Example 1 herein is heated to 40° C. and while at that temperature there is added thereto about 100 parts of HCl (32% conc.) while stirring.

The resultant mass is maintained at 40° C. while being constantly stirred for a period of about 5–10 minutes. By virtue of the foregoing the amphoteric 1 in said solution is converted into its external salts of the type shown as Salts I and II herein and/or other salts of longer lengths but of the aforesaid type.

Sand external self-salts, like compounds of Formula I, are water-soluble in low as well as high concentrations as evidenced by the fact that when 1 cc. of said solution containing said salts is added to 100 cc. of clear tap water and shaken therewith, clearness is maintained. The aforesaid is not changed even when the pH of said solution is first adjusted to 6.8 for comparative purposes.

If desired a mixture of two or more different ampholites, such as a mixture of ampholites 1, 2 and 3 for example may be treated in the same manner as above thereby to provide such salts of different ampholites, with ampholites 1 and 2, 2 and 3 and/or 1, 2 and 3, as well as 1 and 1, 2 and 2, and 3 and 3 being reacted with each other to provide salts of the type of Salts I and II heretofore shown structurally.

These external self-salts also have excellent water-solubility characteristics in high and low concentration, in aqueous solution are good foaming agents and have the same uses as the compounds of Formula I herein.

It is significant that in the production of aqueous solutions of compounds of Formula III which have a pH of 6.8, an example of which is such as solution thereof of Example 1 herein, that such solutions are not water-soluble in low concentrations as hereinbefore set forth; whereas aqueous solutions of said external self-salts adjusted to a corresponding pH are water soluble in correspondingly low concentrations. The foregoing clearly establishes that the internal salts of Formula III are different in character from the external self-salts hereinbefore described and that the treatment of compounds of Formula I results in the production of external self salts and not a reversion to the internal salts.

As distinguished from the aforesaid my novel compounds of Formula I as well as the external self-salts thereof are soluble in clear water to provide clear solutions in all concentrations, that is high concentrations as well as low concentrations of 10% or less.

It is to be understood of course, that the respective definitions of R, $R_1$, x and M are the same as they are used in the various formulas herein; and that wherever Na is used in any of the organic structural formulas in the description and claims herein, it is meant to cover its obvious equivalents, such as hydrogen, any other alkali metal or other equivalents well known to the art which may be substituted therefor; and that wherever caustic soda is employed in the description and claims, it is meant to cover its obvious equivalents, among which are KOH, as well as other appropriate alkalies.

While fair yields of said novel compounds of Formula I may be obtained by employing respective quantities of my novel sultone and compounds of Formula II in the mole proportion of 1 to 1 as in Examples 1–3 herein, it is preferable that the mole ratio of the quantity of sultone to the quantity of compounds of Formula II be about 1–2 moles and for most purposes 1.2–1.8 moles and more preferably approximately 1.5 moles of sultone per mole of compound of Formula II employed, whereby high yields, measuring more than 90% of theoretical, of the novel amphoterics in aqueous solution may be obtained.

It is to be understood that the following claims are intended to cover generic and specific features of the invention herein described and all statements of the scope of the invention which as a matter of language might be said to fall therebetween, and that they are intended to be inclusive in scope and not exclusive in that, if desired, other materials may be added to my novel products herein claimed without departing from the spirit of the invention.

I claim:

1. A compound selected from the group consisting of (a) compounds and (b) external self salts of (a) of the formula:

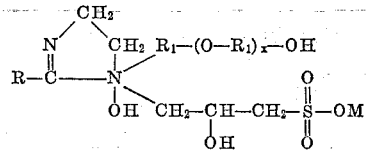

wherein R is hydrocarbon of 4–18 carbon atoms, each $R_1$ is saturated hydrocarbon of 2–4 carbon atoms, x is 0–8 and M is selected from the group consisting of hydrogen and alkali metals and external self-salts.

2. A compound as defined in claim 1, and wherein R is only ethylenically unsaturated hydrocarbon of 4–18 carbon atoms.

3. A compound as defined in claim 1, and wherein R is alkyl of 4–18 carbon atoms.

4. A compound of the formula:

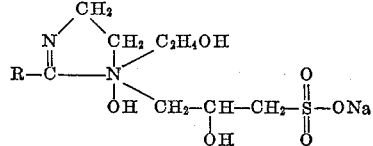

wherein R is aliphatic hydrocarbon of 4–18 carbon atoms.

5. A compound of the formula:

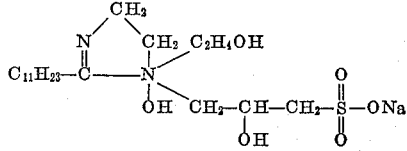

References Cited by the Examiner

UNITED STATES PATENTS

| | | | |
|---|---|---|---|
| 2,154,922 | 4/1939 | Waldmann et al. | 260—309.6 |
| 2,211,001 | 8/1940 | Chwala | 260—309.6 |
| 2,528,378 | 10/1950 | Mannheimer | 260—309.6 |
| 2,697,116 | 12/1954 | Stayner | 260—501 |
| 2,697,656 | 12/1954 | Stayner et al. | 260—501 |
| 2,781,357 | 2/1957 | Mannheimer | 260—309.6 |
| 2,957,003 | 10/1960 | Johnson | 260—309.6 |

FOREIGN PATENTS

| | | |
|---|---|---|
| 532,405 | 4/1955 | Belgium. |
| 559,840 | 2/1958 | Belgium. |
| 940,834 | 3/1956 | Germany. |
| 764,340 | 12/1956 | Great Britain. |
| 772,223 | 4/1957 | Great Britain. |

OTHER REFERENCES

Gutmann: Jour. Soc. Dyers and Colorists, vol. 75, No. 2, page 83 (1959).

Helberger: Chem. Abstracts, vol. 41, Col. 4101 (1947).

Helberger et al.: German application 1,018,421, printed Oct. 31, 1957.

Schwartz et al.: Surface Active Agents, pages 10, 218, and 225–227, Interscience, New York, 1949.

WALTER A. MODANCE, *Primary Examiner.*

DUVAL T. McCUTCHEN, IRVING MARCUS,
*Examiners.*